United States Patent
Tal-Gutelmacher et al.

(10) Patent No.: US 9,786,445 B2
(45) Date of Patent: Oct. 10, 2017

(54) SUPERCAPACITOR CONFIGURATIONS WITH GRAPHENE-BASED ELECTRODES AND/OR PEPTIDE

(71) Applicant: ELBIT SYSTEMS LAND AND C4I LTD., Netanya (IL)

(72) Inventors: Ervin Tal-Gutelmacher, Hod Hasharon (IL); Erez Schreiber, Rishon Lezion (IL)

(73) Assignee: Elbit Systems Land and C41 Ltd., Netanya (IL)

( * ) Notice: Subject to any disclaimer, the term of this patent is extended or adjusted under 35 U.S.C. 154(b) by 0 days.

(21) Appl. No.: 15/111,593

(22) PCT Filed: Jan. 13, 2015

(86) PCT No.: PCT/IL2015/050044
§ 371 (c)(1),
(2) Date: Jul. 14, 2016

(87) PCT Pub. No.: WO2015/107519
PCT Pub. Date: Jul. 23, 2015

(65) Prior Publication Data
US 2016/0351347 A1 Dec. 1, 2016

(30) Foreign Application Priority Data

Jan. 16, 2014 (IL) .......................................... 230509

(51) Int. Cl.
*H01G 11/52* (2013.01)
*H01G 11/28* (2013.01)
(Continued)

(52) U.S. Cl.
CPC .............. *H01G 11/52* (2013.01); *B82Y 30/00* (2013.01); *H01G 11/24* (2013.01); *H01G 11/28* (2013.01);
(Continued)

(58) Field of Classification Search
CPC ........ H01G 11/52; H01G 11/46; H01G 11/70; H01G 11/48; H01G 11/84; H01G 11/32; H01G 11/24; H01G 11/68
See application file for complete search history.

(56) References Cited

U.S. PATENT DOCUMENTS

2008/0316678 A1* 12/2008 Ehrenberg ............. H01G 9/058
361/503
2010/0195270 A1* 8/2010 Hayakawa ............. B32B 5/022
361/502
(Continued)

FOREIGN PATENT DOCUMENTS

JP 02101726 A * 4/1990

OTHER PUBLICATIONS

Machine translation of JP02101726A which has a publication date of Apr. 13, 1990.*
(Continued)

*Primary Examiner* — David M Sinclair
(74) *Attorney, Agent, or Firm* — Mintz Levin Cohn Ferris Glovsky and Popeo, P.C.; Jonathon P. Western (57) ABSTRACT

One embodiment is an EDLC with a capacitor cell that includes two electrodes of opposite polarity aligned in parallel, and a peptide separator disposed between the electrodes. The separator may be a peptide coating on an electrode surface. Another embodiment is an electrode for an electrochemical energy storage device, such as an EDLC, the electrode including graphene and coated with peptide. The peptide may act as a separator for the EDLC. A further embodiment is an electrode for an electrochemical energy storage device, the electrode-unit including: two graphene layers, CNTs, and electrolyte. The graphene layers are arranged separated along a first axis and aligned with parallel surfaces, where at least one graphene layer is coated with peptide. The CNTs are arranged along a second axis
(Continued)

orthogonal to the first axis and disposed between the graphene layers. The electrolyte is impregnated within the volume defined between the graphene layers and CNTs.

10 Claims, 7 Drawing Sheets

(51) Int. Cl.

| | | |
|---|---|---|
| H01G 11/36 | (2013.01) | |
| B82Y 30/00 | (2011.01) | |
| H01G 11/70 | (2013.01) | |
| H01G 11/84 | (2013.01) | |
| H01G 11/24 | (2013.01) | |
| H01G 11/32 | (2013.01) | |
| H01G 11/46 | (2013.01) | |
| H01G 11/48 | (2013.01) | |
| H01G 11/68 | (2013.01) | |
| H01G 11/12 | (2013.01) | |

(52) U.S. Cl.
CPC ............ *H01G 11/32* (2013.01); *H01G 11/36* (2013.01); *H01G 11/46* (2013.01); *H01G 11/48* (2013.01); *H01G 11/68* (2013.01); *H01G 11/70* (2013.01); *H01G 11/84* (2013.01); *H01G 11/12* (2013.01); *Y02E 60/13* (2013.01)

(56) References Cited

U.S. PATENT DOCUMENTS

| | | | | |
|---|---|---|---|---|
| 2010/0252426 | A1* | 10/2010 | Tsukuda | H01G 9/02 204/296 |
| 2010/0259867 | A1* | 10/2010 | Machida | H01G 9/016 361/502 |
| 2011/0121264 | A1 | 5/2011 | Choi et al. | |
| 2011/0183180 | A1* | 7/2011 | Yu | H01G 11/36 429/128 |
| 2011/0206992 | A1* | 8/2011 | Campbell | H01M 4/80 429/235 |
| 2013/0004850 | A1* | 1/2013 | Shon | C01G 45/02 429/224 |
| 2013/0163146 | A1* | 6/2013 | Lee | H01G 11/32 361/502 |
| 2013/0295374 | A1 | 11/2013 | Tang et al. | |
| 2014/0030590 | A1* | 1/2014 | Wang | H01B 1/04 429/211 |
| 2014/0127584 | A1* | 5/2014 | Kim | C01B 31/04 429/231.8 |
| 2015/0055275 | A1* | 2/2015 | Joos | H01G 11/32 361/502 |
| 2015/0248972 | A1* | 9/2015 | Tang | B82Y 30/00 361/502 |
| 2015/0318120 | A1* | 11/2015 | He | B82Y 10/00 361/502 |

OTHER PUBLICATIONS

Beker et al., "Bioinspired nanostructural peptide materials for supercapacitor electrodes", J. Mater. Res., vol. 25, No. 3, Aug. 2010.
Fan et al., "A Three-Dimensional Carbon Nanotube/Graphene Sandwich and Its Application as Electrode in Supercapacitors", Advanced Materials, 2010, 22, 3723-3728.
Du et al., "Preparation of Tunable 3D Pillared Carbon Nanotube-Graphene Networks for High-Performance Capacitance", Chemistry of Materials, 2011, 23, 4810-4816.
International Search Report in corresponding Israel Application No. PCT/IL2015/050044.

\* cited by examiner

SUPERCAPACITOR CONFIGURATIONS WITH GRAPHENE-BASED ELECTRODES AND/OR PEPTIDE

FIELD OF THE DISCLOSED TECHNIQUE

The disclosed technique generally relates to electrochemical energy storage devices, and more particularly, to supercapacitor configurations that include graphene and/or peptide.

BACKGROUND OF THE DISCLOSED TECHNIQUE

Electrochemical energy storage devices include electrochemical capacitors and lithium batteries. An electric double-layer capacitor (EDLC), also known as a "supercapacitor" or "ultracapacitor", is a type of electrochemical capacitor, which is characterized by a very high energy density relative to conventional capacitors. Instead of two metal plates separated by a regular dielectric material, an EDLC involves the separation of charges in a double electric field formed at the interface between an electrolyte and a high surface area conductor. A basic EDLC cell configuration is a pair of highly porous electrodes, typically including activated carbon, disposed on opposite faces of parallel conductive plates known as current collectors. The electrodes are impregnated with an electrolyte, and separated by a separator consisting of a porous electrically-insulating and ion-permeable membrane. When a voltage is applied between the electrodes, negative ions from the electrolyte flow to the positive electrode while positive ions from the electrolyte flow to the negative electrode, such that an electric double layer is formed at each electrode/electrolyte interface by the accumulated ionic charges. As a result, energy is stored by the separation of positive and negative charges at each interface. The separator prevents electrical contact between the conductive electrodes but allows the exchange of ions. When the EDLC is discharged, such as by powering an external electrical device, the voltage across the electrodes results in current flow as the ions discharge from the electrode surfaces. The EDLC may be recharged and discharged again over multiple charge cycles.

The extremely high surface area of the activated carbon electrodes, combined with a separation distance between electric double layers on the order of nanometers (compared with millimeters for electrostatic capacitors and micrometers for electrolytic capacitors), enables the absorption of a large number of ions per unit mass and, thus, an energy density that is orders of magnitude greater than that of conventional capacitors. The electrolyte may be an aqueous-based solution (e.g., a water solution of potassium hydroxide (KOH) or sulfuric acid ($H_2SO_4$)) or organic-based (e.g., acetonitrile ($CH_3CN$), polypropylene carbonate). In an aqueous-based electrolyte, the voltage is limited to approximately 1V (above which water decomposes), whereas organic-based electrolytes have a higher maximum voltage of about 2.5-3.0V. Since each individual EDLC cell is limited to a relatively low voltage, multiple EDLC cells may be connected in series to enable higher voltage operation. However, serial connection reduces the total capacitance and also requires voltage-balancing.

While the amount of energy stored per unit weight is generally lower in an EDLC in comparison to electrochemical batteries, the EDLC has a much greater power density and a high charge/discharge rate. Furthermore, an EDLC has a far longer lifespan than a battery and can undergo many more charge cycles with little degradation (millions of charge cycles, compared to hundreds for common rechargeable batteries). Consequently, EDLCs are ideal for applications that require frequent and rapid power delivery, such as hybrid vehicles that are constantly braking and accelerating, while batteries are used to supply a larger amount of energy over a longer period of time. EDLCs are also environmentally friendly (have a long lifespan and are recyclable), safe (no corrosive electrolytes and other toxic materials requiring safe disposal), lightweight, and have a very low internal resistance (ESR). The charging process of an EDLC is also relative simple, as it draws only is the required amount and is not subject to overcharging. An EDLC has a higher self-discharge compared to other capacitors and electrochemical batteries.

Advances in materials and manufacturing methods in recent years have led to improved performance and lower cost of EDLCs, and to their utilization in various applications. For example, EDLCs can be employed to operate low-power electrical equipment, and to provide peak-load enhancement for hybrid or fuel-cell vehicles. EDLCs are also commonly used to complement batteries, such as in order to bridge short power interruptions in an uninterruptible power supply.

Graphene is a carbon allotrope, structured as a planar sheet of $sp^2$-bonded carbon atoms densely packed in a honeycomb crystal lattice. Due to the unique intrinsic properties of graphene, there has been significant interest and research worldwide into the potential utilization of graphene in various nanomaterial applications, particularly with regard to the development of high-performance devices for energy storage and conversion. Graphene exhibits an extremely high surface area to mass ratio, as well as exceptional mechanical strength and flexibility (i.e., having a breaking strength over 100 times greater than a steel film of corresponding thickness). Furthermore, graphene possesses very high electrical conductivity and carrier mobility, and high optical transparency. Consequently, graphene has found use in a variety of electronic components, such as integrated circuits, solar cells, and display screens, as well as electrodes for ultracapacitors and Li-ion batteries. Due to its two-dimensional nature, the properties of graphene are highly anisotropic between the in-plane and out-of-plane directions (e.g., the conductivity perpendicular to the surface is significantly different than the conductivity along the surface). To overcome this effect, three-dimensional graphene architectures have been developed that incorporate carbon nanotube (CNT)-pillared graphene network structures, or interconnected CNT truss-like structures with networked graphene layers. For example, Yu, D.; Dai, L., "Self-assembled graphene/carbon nanotube hybrid films for supercapacitors" J. Phys. Chem. Letters 1, 2010, 467-470, discloses a solution layer-by-layer self-assembly approach to prepare multilayered hybrid carbon films of poly(ethyleneimine)-modified graphene sheets and acid-oxidized multi-walled CNTs to construct supercapacitors with an average specific capacitance of 120,000 F/kg.

Fan, Z. et al., "A Three-Dimensional Carbon Nanotube/Graphene Sandwich and its Application as Electrode in Supercapacitor", Adv. Mater. 2010, 22, 3723-3728, also discloses the preparation of 3D CNT/graphene sandwich (CGS) structures with CNT pillars grown in between the graphene layers by chemical vapour deposition (CVD). A supercapacitor electrode based on such CGS exhibits a specific capacitance of 385 F/g at a scan rate of 10 mV/s in 6 M KOH aqueous solution.

Du, F. et al., "Preparation of Tunable 3D Pillared Carbon Nanotube-Graphene Networks for High-Performance Capacitance", Chem. Mater. 2011, 23, 4810-4816, discloses the development of 3D pillared vertically aligned carbon nanotube (VACNT)-graphene architectures, by growing VACNTs between graphitic layers in thermally expanded highly ordered pyrolytic graphite (HOPG). By controlling the fabrication process, the length of the VACNT pillars can be tuned. The pillar length (PL) can be further tuned through hybridization with other functional nanomaterials, such as nickel hydroxide, by a simple electrodeposition process.

U.S. Pat. No. 6,031,711 to Tennent et al, entitled "Graphitic nanofibers in electrochemical capacitors", is directed to an electrochemical capacitor with electrodes comprising carbon nanofibers having a high surface area (e.g., greater than 100 $m^2$/gm) and being substantially free of micropores. The nanofibers may be functionalized with at least one functional group of: quinine, hydroquinone, quaternized aromatic amines, mercaptans, or disulfides. The functional groups may be contained in a ladder formula, which may include a graphenic analogue of quinine, napthaline disulfide, or dimethyl pyrazine. The carbon nanofibers may be substantially cylindrical with a substantially constant diameter, having graphitic layers concentric with the nanofiber axis and being substantially free of pyrolytically deposited carbon. The nanofibers may be coated with a thin coating layer of a pyrolyzed carbonaceous polymer.

European Patent No. 786,786 to Varakin, entitled "Capacitor with a double electrical layer", discloses an EDLC with one electrode made of nickel oxide and the other electrode made of a fibrous carbonic material, preferably nickel-plated or copper-plated. The electrolyte is an aqueous solution of an alkali metal carbonate or hydroxide.

U.S. Patent Application Publication No. 2009/0176079 to Cabrera-Perez et al, entitled "Process for the production of porous carbon moldings", discloses a process based on phase separation for producing porous carbon moldings. The process includes: preparing a mixture comprising at least one carbon former and one organic polymer in an organic solvent; evaporating the solvent until a viscous or highly viscous material or a corresponding molding is obtained; optionally shaping the material or moulding; and heating the material or moulding to temperatures between 200° C. and 4000° C. Following carbonization or pyrolysis, the carbon former and organic polymer may be converted into non-graphitic carbon or graphite.

U.S. Patent Application Publication No. 2010/0021819 to Zhamu et al, entitled "Graphene nanocomposites for electrochemical cell electrodes", is directed to a graphene nanocomposite material for use in an electrochemical cell electrode, such as a supercapacitor electrode. The composition includes a solid particle of nano-scaled graphene platelets (NGPs) dispersed in, or bonded by, a first matrix or binder material. The NGPs occupy a weight fraction of 2% to 98% of the total nanocomposite weight, and are not obtained by graphitizing the binder or matrix material. Multiple solid particles are bonded by a second binder material. The binder materials may include: a polymer, polymeric carbon, amorphous carbon, metal, glass, ceramic, oxide, and/or organic material. The solid particles may include microscopic or meso-scale pores to accommodate electrolyte.

U.S. Patent Application Publication No. 2011/0183180 to Yu et al, entitled "Flexible asymmetric electrochemical cells using nano graphene platelet as an electrode material", is directed to nano graphene platelet (NGP) based electrodes for supercapacitors or supercapacitor-battery hybrid electrochemical cells. The cell includes: a sheet of graphene paper as a first electrode including NGPs having a platelet thickness less than 1 nm, the first electrode having electrolyte-accessible pores; a thin-film or paper-like first separator and electrolyte; and a thin-film or paper-like second electrode which is different in composition from the first electrode. The separator is sandwiched between the first and second electrode to form a flexible laminate configuration. The electrodes may include a binder material that bonds graphene platelets together to form a cohered nanocomposite layer.

U.S. Patent Application Publication No. 2011/0121264 to Choi et al, entitled "Composite structure of graphene and nanostructure and method of manufacturing the same", is directed to composite structures of graphene disposed with at least one one-dimensional nanostructure, such as nanowires, nanotubes, and/or nanorods. In one embodiment, the nanostructure is disposed substantially perpendicular to and inclined with respect to a first graphene and a second graphene spaced apart from the first graphene, and an insulating material fills in the spaces left by the nanostructure.

U.S. Patent Application Publication No. 2013/0295374 to Tang et al, entitled "Graphene sheet film connected with carbon nanotubes, method for producing same, and graphene sheet capacitor using same", discloses a graphene sheet assembly film with multiple graphene sheet laminates, each of which includes two or more graphene sheets laminated parallel to each other via first carbon nanotubes. The graphene sheet laminates are electrically and mechanically three-dimensionally connected to each other via second carbon nanotubes.

Han T. H., et al., "*Peptide/Graphene Hybrid Assembly into Core/Shell Nanowires*", Advanced Materials, Vol. 22, 2010, pp. 2060-2064, discloses an approach for producing peptide/graphene core/shell nanowires by single-step solution processing. The aromatic peptide of diphenylalanine, which was found to self-assemble into highly stable nanoscale morphologies such as nanotubes, nanowires, and nanoribbons, is used. The resultant hybrid nanowires were electroconductive, and were further processed to create a hollow graphene-shell network that could be employed as a supercapacitor electrode.

SUMMARY OF THE DISCLOSED TECHNIQUE

In accordance with one aspect of the disclosed technique, there is thus provided an electrochemical energy storage device that includes at least one capacitor cell. The capacitor cell includes: a pair of graphene electrodes of opposite polarity, arranged along a first axis and aligned with their surfaces in parallel; and an electrolyte, impregnated within the graphene electrodes. At least one of the graphene electrodes includes a peptide coating acting as an inert, electrically-insulating and ion-permeable separator, such that the capacitor cell does not require an additional separator beyond the peptide coating. At least one of the graphene electrode may include at least one electrode-unit including: a pair of graphene layers, a plurality of carbon nanotubes (CNTs), and an electrolyte, where the graphene layers are arranged along a first axis and aligned with their surfaces in parallel and separated from one another, the CNTs are arranged along a second axis orthogonal to the first axis and disposed in between the graphene layers, and the electrolyte is impregnated within the volume defined between the graphene layers and CNTs. The peptide may be: an aromatic peptide, a non-aromatic peptide, a polypeptide, and/or a protein. At least one of the graphene electrodes may be disposed on a current collector. The current collector may be a metal substrate or a metallic foam. The volume defined between the graphene layers and the CNTs of an electrode-unit may be configured to correspond to the diameter of the electrolyte ions. The electrochemical energy storage device may be an electric double-layer capacitor (EDLC). At least one of the graphene electrodes may include: a transitional metal oxide and/or a conductive polymer. The pair of graphene electrodes of a capacitor cell may be configured asymmetrically, where the graphene electrodes are composed of different materials, have different weights, and/or have different thicknesses.

In accordance with another aspect of the disclosed technique, there is thus provided a method for manufacturing an electrochemical energy storage device that includes at least one capacitor cell. The method includes the procedures of: arranging a pair of graphene electrodes of opposite polarity along a first axis, the graphene electrodes aligned with their surfaces in parallel; coating at least one of the graphene electrodes with a peptide coating acting as an inert, electrically-insulating and ion-permeable separator, such that the capacitor cell does not require an additional separator beyond the peptide coating; and impregnating an electrolyte the graphene electrodes. The method may further include the procedure of preparing at least one electrode-unit of at least one of the graphene electrodes by: arranging a pair of graphene layers along a first axis aligned with their surfaces in parallel and separated from one another; arranging a plurality of CNTs along a second axis that is orthogonal to the first axis, where the CNTs are disposed in between the graphene layers; and impregnating an electrolyte within the volume defined between the graphene layers and the CNTs.

BRIEF DESCRIPTION OF THE DRAWINGS

The disclosed technique will be understood and appreciated more fully from the following detailed description taken in conjunction with the drawings in which.

DETAILED DESCRIPTION OF THE EMBODIMENTS

The disclosed technique overcomes the disadvantages of the prior art by providing novel compositions and configurations for an electric double-layer capacitor (EDLC) or other electrochemical energy storage devices. The disclosed technique provides a first configuration that includes an electrode composed of graphene and coated with peptide. An EDLC cell according to the first configuration includes a pair of electrodes of opposite polarity aligned with their surfaces in parallel, with at least one electrode composed of graphene and coated with peptide. The peptide-coated graphene electrode may be deposited on a conductive substrate that acts a current collector, or alternatively the graphene electrode itself may serve as a current collector. A separator may be disposed between the two graphene electrodes in an EDLC cell, or alternatively the peptide coating itself may serve as a separator. A peptide layer may alternatively serve as a separator for an EDLC cell with non-graphene electrodes. The disclosed technique provides a second configuration that includes an electrode made up of at least one electrode-unit, where each electrode-unit includes a pair of separated graphene layers aligned with their surfaces in parallel, a plurality of carbon nanotubes (CNTs) aligned orthogonally in between the graphene layers, and an electrolyte impregnated within the volume between the graphene layers and CNTs. The graphene layers may be coated with peptide. The disclosed technique provides a third configuration in which the graphene electrode is formed onto a metallic foam substance, such as nickel (Ni) foam, which acts as a current collector for the electrode. The metallic foam cavities are coated with graphene, and may be further coated with peptide.

Figure 1A:
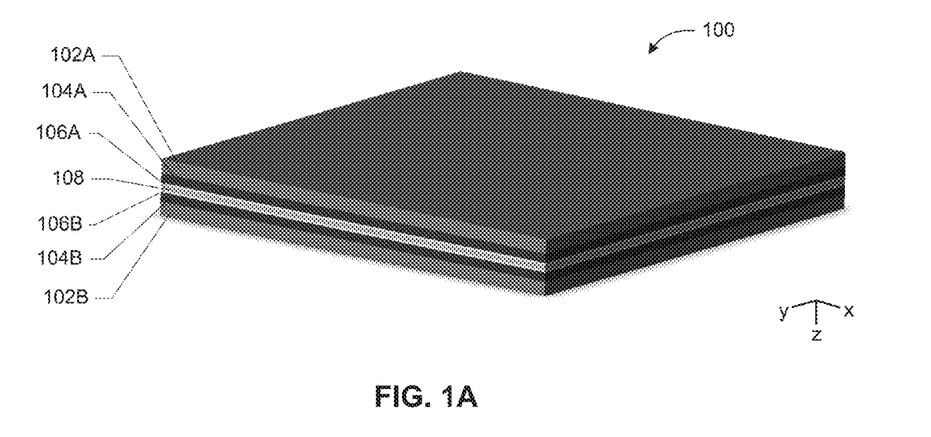
FIG. 1A is a perspective view schematic illustration of a first configuration of a graphene-based EDLC cell, constructed and operative in accordance with an embodiment of the disclosed technique.

Reference is now made to FIG. 1A, which is a perspective view schematic illustration of a first configuration of a graphene-based EDLC cell, generally referenced 100, constructed and operative in accordance with an embodiment of the disclosed technique. EDLC cell 100 includes a pair of conductive substrates 102A, 102B aligned with their surfaces in parallel. The conductive substrates 102A, 102B serve as current collectors for EDLC cell 100, and may be composed of a conductive polymer or a metal that is inert to the electrolyte. On the inner surface of each conductive substrate 102A, 102B is disposed a respective graphene layer 104A, 104B, constituting a pair of electrodes. The inner surface of each graphene layer 104A, 104B is coated with a respective layer of peptide 106A, 106B. A separator 108 is sandwiched in between the two peptide-coated graphene electrodes, which are pressed against one another. Each electrode is impregnated with an electrolyte.

Figure 1B:
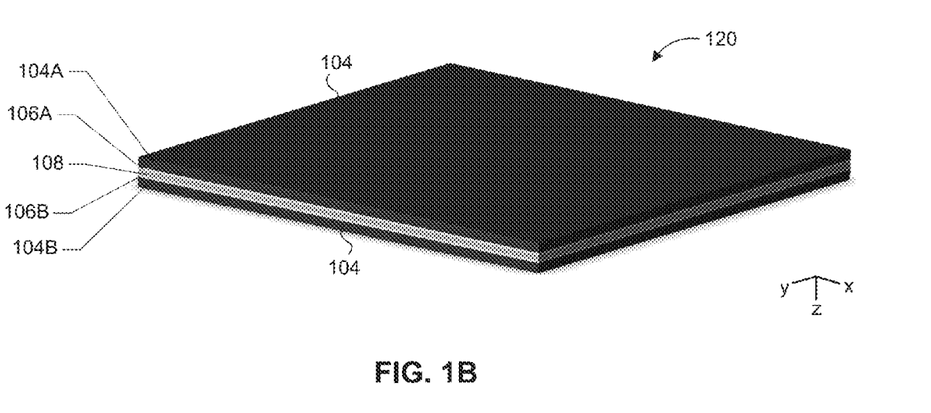
FIG. 1B is a perspective view schematic illustration of a first configuration of a graphene-based EDLC cell, constructed and operative in accordance with another embodiment of the disclosed technique.

Alternatively, the graphene layer 104 may function simultaneously as both an electrode and a current collector. Reference is made to FIG. 1B, which is a perspective view schematic illustration of a first configuration of a graphene-based EDLC cell, generally referenced 120, constructed and operative in accordance with another embodiment of the disclosed technique. EDLC cell 120 is analogous to EDLC cell 100 (FIG. 1A) without the conductive substrates 102A, 102B, such that the graphene layers 104A, 104B of cell 120 form both the current collector and the electrode. Each graphene layer 104A, 104B is coated with a respective peptide layer 106A, 106B, in between which is disposed the separator 108.

In addition to the graphene 104 and the peptide 106, the electrode may further include (or be coated with) additional substances or compositions, such as a transitional metal oxide (TMO), or a conductive polymer such as polyaniline (PANI). A TMO-graphene electrode may be prepared by means of mechanical processes, such as mixing, or chemical processes, such as chemical coating (e.g., via wet chemistry deposition or electro-deposition processes) of the graphene with TMO particles. In general, a graphene electrode of the disclosed technique includes at least some minimal percentage of graphene, and may further include additional substances or compositions. Accordingly, the term "graphene layer" as used herein refers to a layer that includes at least some amount of graphene, however minimal. It is further appreciated that the term "layer", and grammatical variations thereof, as used herein is not limited to a uniform sheet of a substance (or substances), but encompasses any amount of the substance(s) that at least partially or fully covers another surface and/or lies in between two other surfaces. Similarly, the term "coating", and grammatical variations thereof, as used herein, encompasses any amount of a coated substance(s) applied to another material or surface, using any suitable coating application technique or process, where the coated substance(s) at least partially covers the material or surface on which it is applied.

The electrolyte may be for example an aqueous-based electrolyte, such as an alkaline solution of potassium hydroxide (KOH) or sulfuric acid ($H_2SO_4$), or a neutral salt solution ($Na_2SO_4$). The electrolyte may generally encompass aqueous solutions in the entire pH range (i.e., pH<7 is an acidic electrolyte; pH>7 is an alkaline electrolyte; and pH=7 is a neutral electrolyte).

The separator 108 is an inert membrane, typically a solid or gel substance, which is ion-permeable (i.e., allowing the exchange of ions therethrough) and electrically-insulating (i.e., preventing the transfer of electrons therethrough). Separator 108 may optionally include multiple layers (e.g., a plurality of separate ion-permeable and electrically-insulating membranes arranged successively).

Peptide 106 may be any type of peptide, including but not limited to: aromatic peptides (e.g., Neuropeptide FF), non-aromatic peptides (e.g., LL-37), proteins (e.g., Sp1), and the like. Accordingly, the term "peptide" as used herein also encompasses "polypeptides" (i.e., a chain of amino acids, regardless of length, and typically lacking defined conformation) as well as "proteins" (i.e., longer polypeptide chains, typically with a stable conformation), in addition to basic peptides (i.e., short chains of amino acid monomers linked by peptide (amide) bonds).

Figure 1C:
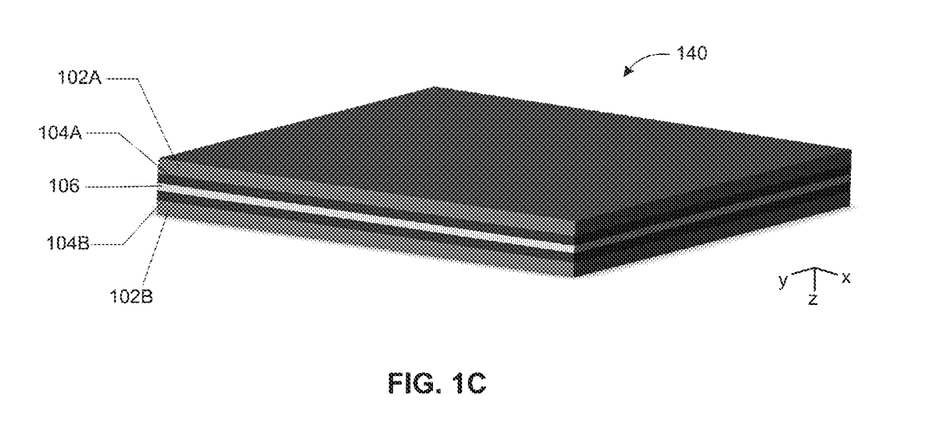
FIG. 1C is a perspective view schematic illustration of a first configuration of a graphene-based EDLC cell, constructed and operative in accordance with a further embodiment of the disclosed technique.
Figure 1D:
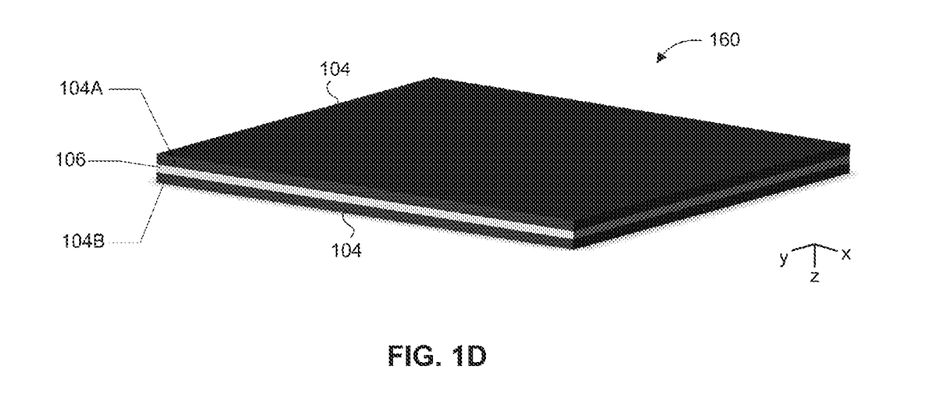
FIG. 1D is a perspective view schematic illustration of a first configuration of a graphene-based EDLC cell, constructed and operative in accordance with yet another embodiment of the disclosed technique.

According to another embodiment of the disclosed technique, the peptide layer 106 may function as a separator as well, since peptide is porous, ion-permeable, and electrically-insulating, and thus meets the requirements of an ideal separator. In particular, peptide layer 106 is characterized with porosity due to its hollow nanotube structure and large internal spacing between peptide tubes. Peptide layer 106 also has a wide electronic band gap (e.g., greater than 4 eV), and is ion-permeable (allowing anions and cations from the electrolyte to easily move between the electrodes under application of an external electric field). Reference is made to FIG. 1C, which is a perspective view schematic illustration of a first configuration of a graphene-based EDLC cell, generally referenced 140, constructed and operative in accordance with a further embodiment of the disclosed technique. EDLC cell 140 is analogous to EDLC cell 100 (FIG. 1A) with the exception that the peptide layer 106 in between the two graphene layers 104A, 104B also serves as a separator for the EDLC cell 140. Reference is made to FIG. 1D, which is a perspective view schematic illustration of a first configuration of a graphene-based EDLC cell, generally referenced 160, constructed and operative in accordance with yet another embodiment of the disclosed technique. EDLC cell 160 is similar to both EDLC cell 120 (FIG. 1B) and EDLC cell (FIG. 1C), in that the graphene layers 104A, 104B form both the current collector and the electrode, while the peptide layer 106 disposed between the two graphene layers 104A, 104B also serves as a separator. When acting as a separator, peptide layer 106 covers substantially the entire surface of graphene layer 104A and/or graphene layer 104B, e.g., forming a continuous coating, to ensure that short circuiting is avoided. The elimination of a dedicated separator 108 may result in a further decrease of internal resistance in EDLC cells 140, 160, since the internal resistance is approximately equal to the sum of the individual resistances of the various components (electrodes, electrolyte, separator, conductive substrates). Additionally, the elimination of a dedicated separator 108 may reduce the overall weight of EDLC cells 140, 160, and thus increase the specific energy density. It is appreciated that a peptide layer may also function as a separator for an EDLC cell with non-graphene electrodes, such as electrodes comprising primarily activated carbon.

The graphene layer 104 may be composed of a single monolayer or several monolayers. Generally, the graphene layer 104 is approximately a few nanometers in thickness. For example, graphene layer 104 may include 4 monolayers each having a thickness of approximately 0.345 nm, resulting in an overall thickness of about 1.38 nm. The peptide layer 106 may have a thickness ranging from a few nanometers to a few hundreds of micrometers. If the peptide layer 106 also functions as a separator then the thickness may be closer to the upper limit of this range (e.g. around 100 μm).

Each EDLC cell (100, 120, 140, 160) includes two graphene electrodes (104A, 104B) with opposite polarity, and a separator 108 (which may be replaced by peptide layer 106) in between the complementary electrodes. The application of a voltage between the electrodes 104A, 104B results in electrolytic ionic transfer and the formation of an electric double-layer at each electrode and electrolyte interface. The complementary electrodes 104A, 104B of an individual EDLC cell (100, 120, 140, 160) may be composed of the same materials and thus be substantially equal in weight and thickness (i.e., "a symmetrical electrode configuration"). Alternatively, the complementary electrodes 104A, 104B of an individual EDLC cell (100, 120, 140, 160) may be composed of different materials and have different weights and/or thicknesses (i.e., "an asymmetrical electrode configuration"). For example, an asymmetrical electrode configuration may include an anode composed of graphene only and a cathode composed of graphene mixed with a TMO and conductive additives (at various concentrations), such as an graphene anode with a manganese dioxide ($MnO_2$) cathode at a weight ratio of approximately 1:0.8 (graphene:$MnO_2$). An asymmetrical electrode configuration may alternatively include a graphene anode along with a non-graphene cathode, such as a cathode composed of approximately 90% TMO and 10% conductive additives. In general, the TMO concentration of an electrode may be between approximately 60%-95%, with the rest being composed of conductive additive and/or graphene. An asymmetrical configuration may also include complementary electrodes of the same material but with different weights/thicknesses, such as, for example, a graphene anode with a graphene cathode at a thickness ratio of approximately 1:1.25. An asymmetrical electrode configuration may provide increased cell voltage, increased capacitance, and improved performance of the EDLC, especially at high temperatures.

Multiple cells may be arranged successively (adjacent to one another) and connected in series to form a stack, providing an EDLC which is able to withstand a higher voltage compared to that of an individual EDLC cell. The negative electrodes of all the EDLC cells in the stack are electrically coupled with a first terminal lead-out, while the positive electrodes of all the EDLC cells in the stack are electrically coupled with a second terminal lead-out. The external ends of the two terminal lead-outs are electrically connected to respective terminals of an external power source.

It will be appreciated that the average specific capacitance (and thus the total energy storage capacity) of a peptide-coated graphene electrode (as in EDLC cells 100, 120, 140, 160) has been found to be significantly larger than for non-peptide-coated graphene electrode EDLCs, which may be at least partially due to the reduced thickness of the electrodes. The peptide-coated graphene electrode EDLCs also provides an enhanced specific energy and power density, while maintaining high cycling stability and the ability to be charged and discharged at high currents. These characteristics are applicable regardless of whether the peptide also functions as a separator, or whether the electrode includes a separate (non-peptide) separator. The structure of these peptide-coated graphene electrode EDLC cells, having dimensions on the order of nanometers (nm) to micrometers (μm), also enables them to be well controlled for a variety of practical supercapacitor applications. In general, a peptide-coated graphene electrode in accordance with the first configuration of the disclosed technique may be used in various types of electrochemical energy storage devices, including but not limited to: electrochemical capacitors (e.g., an EDLC), lithium-based batteries (e.g., a lithium-ion or lithium-sulfur battery), and the like.

Figure 2A:
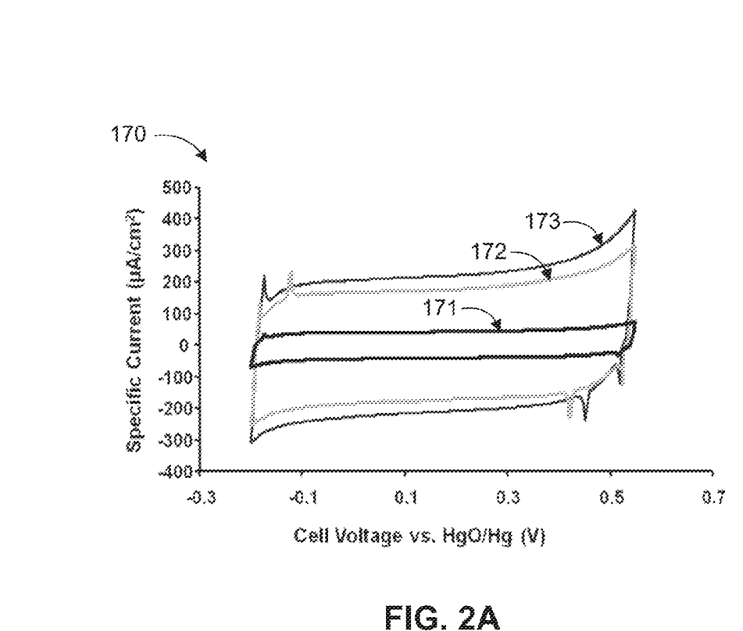
FIG. 2A is a cyclic voltammogram of specific current as a function of cell voltage vs. HgO/Hg at a given scan rate, for experimental samples of non-peptide-coated and peptide-coated graphene electrodes, in accordance with the first configuration of a graphene-based EDLC of the disclosed technique.
Figure 2B:
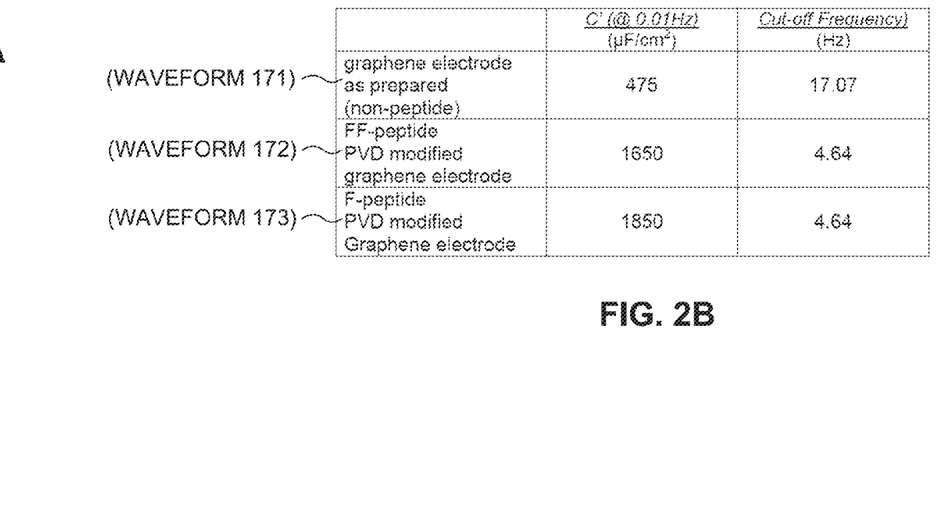
FIG. 2B is a cyclic voltammogram of specific capacitance as a function of frequency at a given scan rate, for experimental samples of non-peptide-coated and peptide-coated graphene electrodes, in accordance with the first configuration of a graphene-based EDLC of the disclosed technique.

Reference is now made to FIGS. 2A and 2B. FIG. 2A is a cyclic voltammogram, generally referenced 170, of specific current (μA/cm$^2$) as a function of cell voltage vs. HgO/Hg (V) at a given scan rate, for experimental samples of non-peptide-coated and peptide-coated graphene electrodes, in accordance with the first configuration of a graphene-based EDLC of the disclosed technique. FIG. 2B is a cyclic voltammogram, generally referenced 175, of specific capacitance (μf/cm$^2$) as a function of frequency (Hz) at a given scan rate, for experimental samples of non-peptide-coated and peptide-coated graphene electrodes, in accordance with the first configuration of a graphene-based EDLC of the disclosed technique. For both cyclic voltammograms 170 and 175, waveform 171 represents a non-peptide-coated graphene electrode, waveform 172 represents a physical vapor deposition (PVD)-coated FF-peptide graphene electrode, and waveform 173 represents an F-peptide PVD-coated graphene electrode. Cyclic voltammogram 170 shows that the peptide-coated graphene electrodes (waveforms 172, 173) are characterized by a significantly greater specific current than that of the non-peptide-coated graphene electrode (waveform 171). Similarly, cyclic voltammogram 175 demonstrates that the peptide-coated graphene electrodes (waveforms 172, 173) have a significantly greater specific capacitance than that of the non-peptide coated graphene electrode (waveform 171), for nearly all frequencies (refer also to accompanying chart).

Figure 3A:
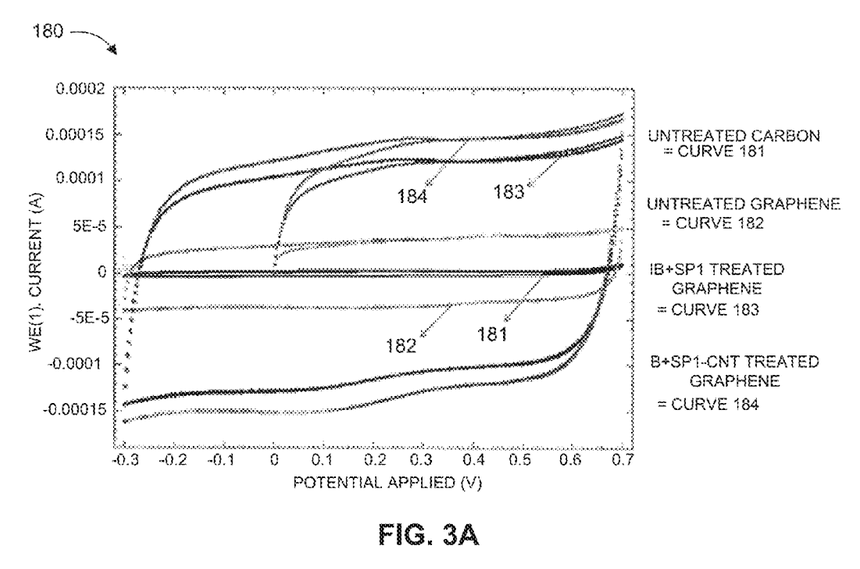
FIG. 3A is a cyclic voltammogram of current as a function of applied potential at a given scan rate, for experimental samples of graphene electrodes before and after being coated with various peptides, in accordance with the first configuration of a graphene-based EDLC of the disclosed technique.
Figure 3B:
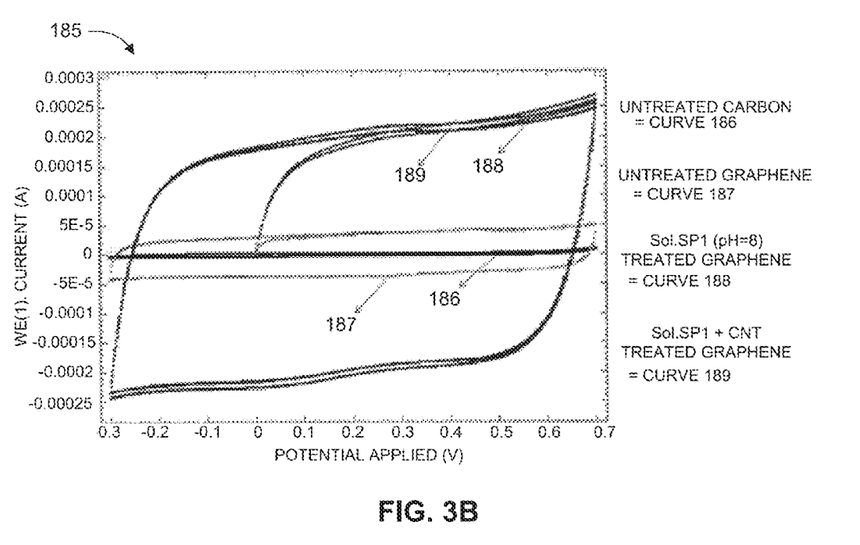
FIG. 3B is a cyclic voltammogram of current as a function of applied potential at a given scan rate, for experimental samples of other graphene electrodes before and after being coated with various peptides, in accordance with the first configuration of a graphene-based EDLC of the disclosed technique.
Figure 3C:
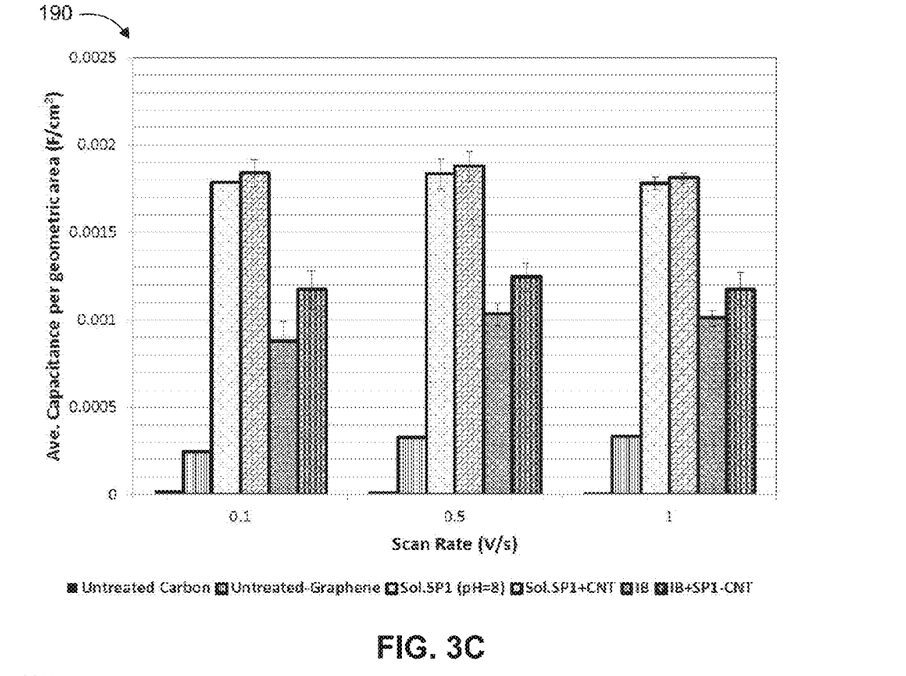
FIG. 3C is a histogram depicting the average capacitance per geometric area as a function of scan rate derived from the cyclic voltammogram of FIG. 3A.
Figure 3D:
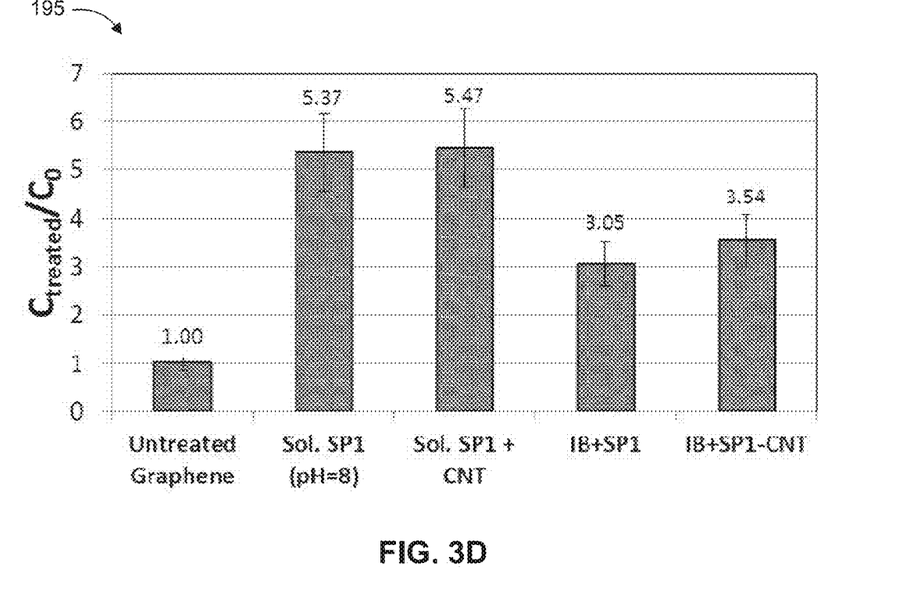
FIG. 3D is a histogram depicting the normalized capacitance at a fixed scan rate derived from the histogram of FIG. 3C.

Reference is now made to FIGS. 3A, 3B, 3C and 3D. FIG. 3A is a cyclic voltammogram, generally referenced 180, of current (A) as a function of applied potential (V) at a given scan rate, for experimental samples of graphene electrodes before and after being coated with various peptides, in accordance with the first configuration of a graphene-based EDLC of the disclosed technique. FIG. 3B is another cyclic voltammogram, generally referenced 185, of current (A) as a function of applied potential (V) at a given scan rate, for experimental samples of other graphene electrodes before and after being coated with various peptides, in accordance with the first configuration of a graphene-based EDLC of the disclosed technique. FIG. 3C is a histogram, generally referenced 180, depicting the average capacitance per geometric area (F/cm$^2$) as a function of scan rate (V/s) derived from the cyclic voltammogram (180) of FIG. 3A. FIG. 3D is a histogram, generally referenced 195, depicting the normalized capacitance at a fixed scan rate (V/s) derived from the histogram (190) of FIG. 3C. For cyclic voltammogram 180, waveform 181 represents an untreated (i.e., without peptide) carbon electrode (for comparison purposes), waveform 182 represents an untreated (i.e., without peptide) graphene electrode, waveform 183 represents a graphene electrode coated with IB+sp1-protein/peptide, and waveform 184 represents a graphene electrode coated with IB+sp1-protein/peptide and CNTs. For cyclic voltammogram 185, waveform 186 represents an untreated carbon electrode (for comparison purposes), waveform 187 represents an untreated graphene electrode, waveform 188 represents a graphene electrode coated with Sol.sp1 (pH=8) protein, and waveform 189 represents a graphene electrode coated with Sol.sp1 protein and CNTs. The normalized capacitance ($c_{treated}/c_0$) in histogram 195 represents the ratio of capacitance for the untreated (without peptide) electrodes and the treated (with peptide) electrodes. Referring to histograms 190, 195, it is evident that the various peptide-coated graphene electrodes (waveforms 183, 184) have significantly increased average/normalized capacitances as compared to the non-peptide-coated graphene/carbon electrodes (waveforms 181, 182), for all scan rates.

In accordance with an embodiment of the disclosed technique, a method for preparing an EDLC includes preparing at least one capacitor cell by: arranging two electrodes of opposite polarity aligned with their surfaces in parallel, at least one of the electrodes including graphene; and coating a surface of at least one graphene electrode with peptide. In accordance with another embodiment of the disclosed technique, a method for preparing an EDLC includes preparing at least one capacitor cell by: arranging two electrodes of opposite polarity aligned with their surfaces in parallel; and arranging a peptide separator in between the electrodes.

Figure 4:
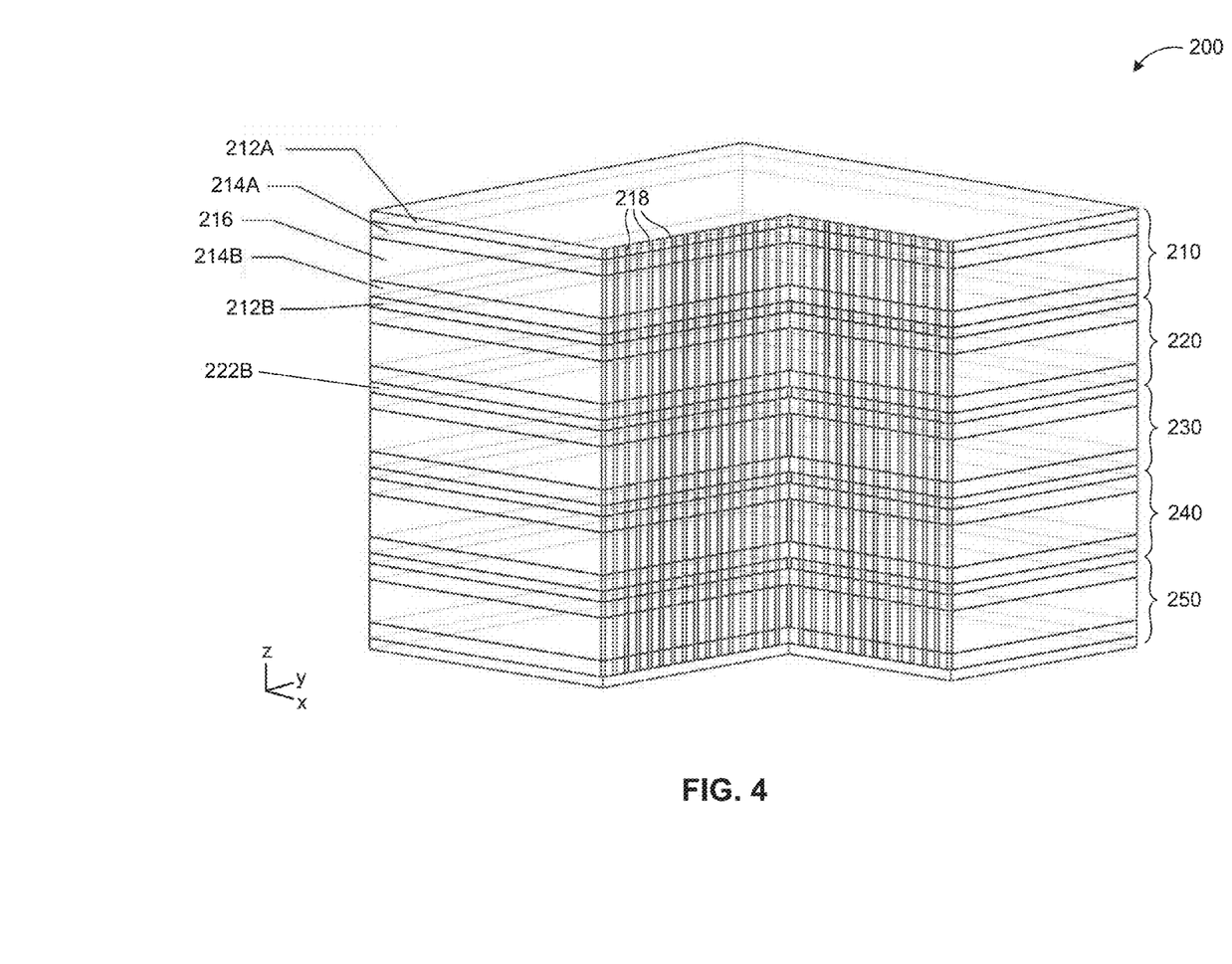
FIG. 4 is a perspective view schematic illustration of a second configuration of a graphene-based EDLC electrode, constructed and operative in accordance with an embodiment of the disclosed technique.

Reference is now made to FIG. 4, which is a perspective view schematic illustration of a second configuration of a graphene-based EDLC electrode, generally referenced 200, constructed and operative in accordance with an embodiment of the disclosed technique. Electrode 200 is composed of multiple electrode-units (210, 220, 230, 240, 250) stacked adjacently, where each individual electrode-unit may itself function as an independent electrode. Each electrode-unit (210, 220, 230, 240, 250) includes a pair of complementary graphene layers separated from one another and aligned with their surfaces in parallel. A plurality of carbon nanotubes (CNTs) are aligned orthogonally in between the parallel graphene layers. In particular, referring to electrode-unit 210, graphene layers 212A and 212B are disposed with their surfaces in parallel. The inner surface of each graphene layer 212A, 212B is coated with a respective layer of peptide 214A, 214B. Multiple CNTs 218 are situated in between the peptide-coated graphene layers 212A, 212B, where the longitudinal axis of the CNTs 218 are aligned substantially along an axis (i.e., the z-axis depicted in FIG. 4) that is orthogonal to the surface of the graphene layers 212A, 212B. More generally, CNTs 218 are disposed within the interval defined between graphene layers 212A, 212B to provide spacing or depth therebetween, whereby at least some of the CNTs 218 may be aligned at an angle relative to the z-axis. An electrolyte 216 is impregnated within the volume defined by the peptide-coated graphene layers 212A, 212B and the CNTs 218. In this manner, the electrode configuration of FIG. 4 may be considered to resemble a multi-story building, where each electrode-unit represents an individual "room", where the graphene layer pair (212A, 212B) represent the "floor" and "ceiling" of that room, and where the CNTs (218) represents the "walls" or "pillars" in between the floor and ceiling. Continuing the analogy, the electrolyte (216) fills up the space within the room in between the walls, the floor, and the ceiling. Thus, the "floor" of a first electrode-unit also constitutes the "ceiling" of the adjacent electrode-unit and vice-versa. For example, graphene layers 212A and 212B make up the ceiling and floor, respectively, of electrode-unit 210, while graphene layers 212B and 222B make up the ceiling and floor, respectively, of adjacent electrode-unit 220. The void, or spacing, in between the ceiling/floor (graphene layers 212) and the walls (CNTs 218) may be controlled and patterned to fit the dimensions of the ions or molecules of electrolyte 216. It is noted that the peptide coatings (214A, 214B) is optional, and electrode 200 may alternatively include non-peptide-coated graphene layers (212A, 212B). It is further noted that an electrode-unit (210, 220, 230, 240, 250) of the second configuration of the disclosed technique may be considered analogous to an EDLC cell (100, 120, 140, 160) of the first configuration of the disclosed technique (FIGS. 1A-1D), with the addition of CNTs 218 to provide added depth or a "three-dimensional characteristic". Conversely, the EDLC cells of the first configuration may be considered a condensed or "two-dimensional version" of the electrode-unit of the second configuration, i.e., where the z-axis is substantially shortened.

A graphene layer 212 of an electrode-unit 210 may optionally be deposited on a current collector (not shown), which may be Nickel (Ni) foam or a metal substrate. Alternatively, a graphene layer 212 of electrode-unit 210 may function also a current collector (as shown in FIG. 4). An EDLC cell may be composed of a pair of electrodes 200, with a polymeric separator situated in between the electrode pair, where the separator is an ion-permeable and electrically-insulating membrane. For example, the outer surface of a graphene layer (e.g., the upper side of graphene layer 212A shown in FIG. 4) may be also coated with peptide, such that the outer peptide serves as a separator between a complementary pair of electrodes 200 forming an EDLC cell.

The spacing in between aligned CNTs 218 may be configured to substantially match the size of the ions of electrolyte 216. This spacing is generally consistent throughout the electrode 200, as a single type of electrolyte is typically used for all electrode-units (210, 220, 230, 240, 250) of an electrode stack (200).

In addition to peptide 214, the graphene layer 212 may further include (or be coated with) additional materials, such as a transitional metal oxide (TMO), or a conductive polymer such as polyaniline (PANI). As with the first EDLC configuration (FIGS. 1A, 1B, 1C, 1D) discussed hereinabove, the electrodes or electrode-units in the second configuration (FIG. 4) may be "asymmetrical". For example, each graphene layer 212A, 212B of an electrode-unit 210 may be composed of a different material and/or may have a different weight and/or different thickness. For example, an asymmetrical electrode-unit configuration may include one graphene layer with a metal oxide coating and one without.

It should be appreciated that the anisotropic properties of graphene provides high conductivity along the y-axis (e.g., along the surface of graphene layers 212 of electrode 200), while the CNTs (e.g., CNTs 218 of electrode 200) provide high conductivity along the z-axis (i.e., perpendicular to graphene layers 212). As a result, the EDLC electrode according to the second configuration of the disclosed technique has high conductivity along both orthogonal (y,z) axes. Furthermore, the three-dimensional structure of the EDLC electrode in the second configuration of the disclosed technique allows the electrolytic ions (of electrolyte 216) full access to relatively large surface area of the graphene 212 which is very thin, while the CNTs 218 provide high conductivity. As well, the graphene layers 212 are sufficiently separated to enable electrolytic transfer, while still maintaining a very small overall volume of the EDLC electrode 200. These characteristics results in significantly increased energy density for this EDLC configuration.

It is further appreciated that when the graphene layers 212A, 212B of an electrode unit 210 of EDLC electrode 200 is coated with peptide 214A, 214B, such an electrode unit 210 also exhibits increased average specific capacitance (e.g., approximately an order of magnitude greater), as compared to a non-peptide coated graphene electrode. Correspondingly, an EDLC with such an electrode would be characterized with an increased total energy capacity (following the formula: $E=CV^2/2$) and increased specific energy and power density, relative to an EDLC with non-peptide coated graphene electrodes, as discussed hereinabove with regard to the first EDLC configuration of the disclosed technique. These results are experimentally supported and depicted in cyclic voltammograms 170, 175 (FIGS. 2A, 2B), cyclic voltammograms 180, 185 (FIGS. 3A, 3B) and histograms 190, 195 (FIGS. 3C, 3C), as discussed hereinabove. These characteristics (e.g., energy enhancement) are applicable regardless of whether the peptide also functions as a separator, or whether the electrode includes a separate (non-peptide) separator. In the case where the peptide also serves as a separator, there may be an additional further decrease in internal resistance of the EDLC and a further reduction in overall weight, resulting in yet a further increase in specific energy density. The electrode 200 of FIG. 4 may generally be used for various types of electrochemical energy storage devices, including but not limited to: electrochemical capacitors (e.g., an EDLC), lithium-based batteries (e.g., a lithium-ion or lithium-sulfur battery), and the like.

Figure 5A:
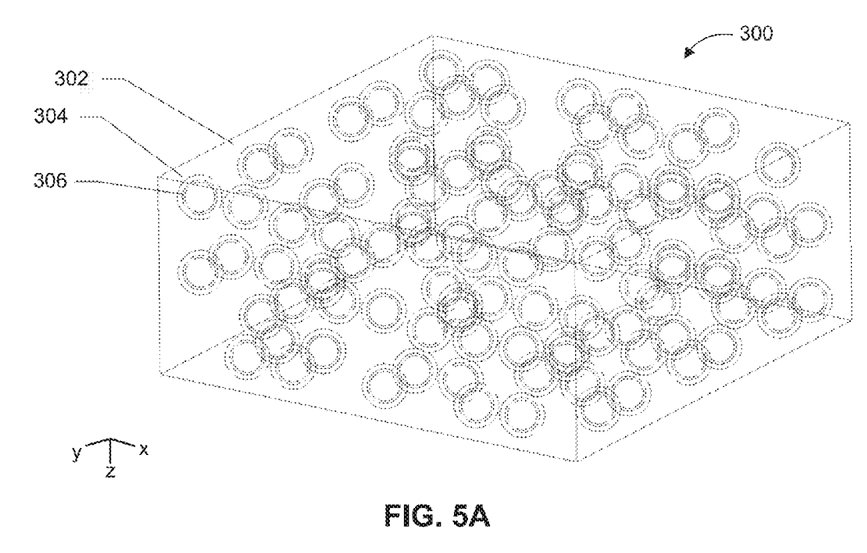
FIG. 5A is a perspective view schematic illustration of a third configuration of a graphene-based EDLC with a metallic foam current collector, constructed and operative in accordance with an embodiment of the disclosed technique.
Figure 5B:
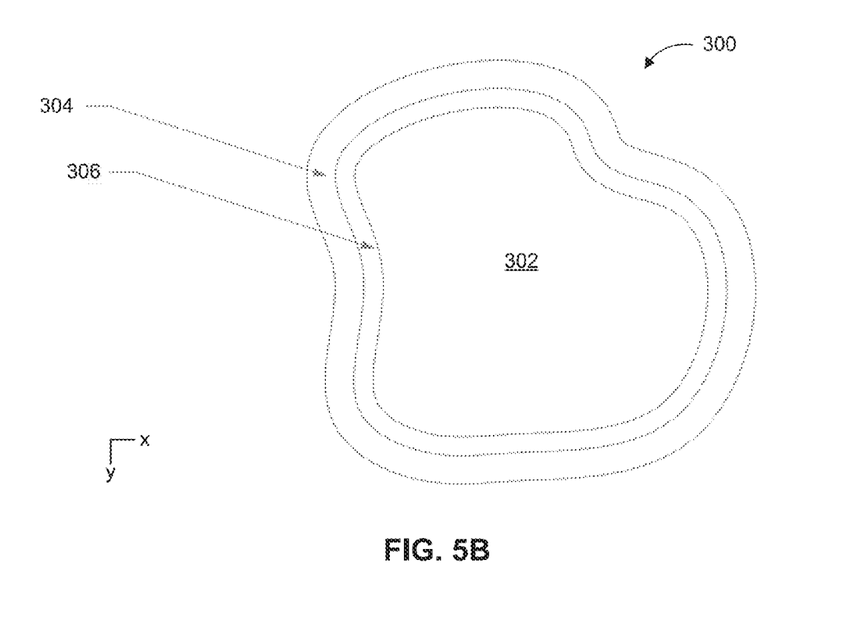
FIG. 5B is a top view schematic illustration of an exemplary foam cavity of the graphene-based EDLC of FIG. 5A.

In accordance with another embodiment of the disclosed technique, a method for preparing an electrode for an electrochemical energy storage device includes preparing at least one electrode-unit by: arranging a pair of graphene layers along a first axis, the graphene layers aligned with their surfaces in parallel and separated from one another; coating at least one graphene layer with peptide; arranging a plurality of CNTs along a second axis that is orthogonal to the first axis, the CNTs disposed in between the graphene layers; and impregnating an electrolyte within the volume defined between the graphene layers and the CNTs. The fabrication method may involve wet chemistry synthesis or deposition techniques, such as chemical vapor deposition (CVD) or physical vapor deposition (PVD), which are routine processes for fabrication of carbonaceous materials such as graphene and CNT. The peptide coating may be implemented using PVD. In one exemplary fabrication method, a thermal CVD process is used for developing the graphene layers and the vertically aligned CNTs, and subsequently the peptide coating is performed above the developed graphene layers within the same fabrication assembly. An example is the intercalated growth of the vertically aligned CNTs between the thermally expanded graphene layers of highly ordered pyrolytic graphite (HOPG), as disclosed in: Du, F. et al., "Preparation of Tunable 3D Pillared Carbon Nanotube-Graphene Networks for High-Performance Capacitance" Chem. Mater. 2011, 23, 4810-4816. The HOPG undergoes acid-treatment and thermal expansion, and is coated with $SiO_2$ to facilitate uniform growth of the vertically aligned CNTs, which are intercalated into the gaps between the graphene layers via an in-situ growth process. The vertically aligned CNTs subsequently grow from both sides of the adjacent graphene layers in the thermally expanded HOPG, effectively "pushing apart" the graphene layers from one another (i.e., resulting in intermediate CNT pillars with the pillar length aligned substantially along the axis orthogonal to the planar surface of the graphene layers, as discussed hereinabove). Reference is now made to FIGS. 5A and 5B. FIG. 5A is a perspective view schematic illustration of a third configuration of a graphene-based EDLC, generally referenced 300, with a metallic foam current collector, constructed and operative in accordance with an embodiment of the disclosed technique. FIG. 5B is a top view schematic illustration of an exemplary foam cavity, generally referenced 310, of the graphene-based EDLC 300 of FIG. 5A. EDLC 300 includes a metallic foam material 302, such as an open-celled foam, which is characterized by very high porosity. Metallic foam 302 is coated (or otherwise infused or permeated) with graphene 304, which seeps into the porous foam cavities. The graphene 304 may be directly synthesized onto the metallic foam 302. The graphene 304 in turn is coated with peptide 306. The graphene 304 and metallic foam are then saturated with an electrolyte (not shown), and then stacked together to form an EDLC 300 where the metallic foam 302 serves as a current collector while the graphene 304 and peptide 306 serve as the electrode. The terminal lead-outs of EDLC 300 are formed directly from metallic foam 302. Metallic foam 302 may be, for example, nickel (Ni) foam, which provides high conductivity and excellent cooling properties in addition to high porosity.

It will be appreciated by persons skilled in the art that the disclosed technique is not limited to what has been particularly shown and described hereinabove.

The invention claimed is:

1. An electric double-layer capacitor (EDLC) comprising at least one capacitor cell, said capacitor cell comprising:
   a pair of graphene electrodes of opposite polarity, arranged along a first axis and aligned with their surfaces in parallel; and
   an electrolyte, impregnated within said graphene electrodes,
   wherein at least one of said graphene electrodes comprises a peptide coating acting as an inert, electrically-insulating and ion-permeable separator, wherein said capacitor cell does not comprise an additional separator beyond said peptide coating, and
   wherein said peptide coating comprises at least one peptide selected from a list consisting of: Neuropeptide FF, LL-37, and Sp1.

2. The EDLC of claim 1, wherein at least one of said graphene electrodes comprises at least one electrode-unit comprising:
   a pair of graphene layers, arranged along a first axis and aligned with their surfaces in parallel and separated from one another;
   a plurality of carbon nanotubes (CNTs), arranged along a second axis that is orthogonal to said first axis, and disposed in between said graphene layers, and
   an electrolyte impregnated within the volume defined between said graphene layers and said CNTs.

3. The EDLC of claim 2, wherein said volume defined between said graphene layers and said CNTs of said electrode-unit is configured to correspond to the diameter of the electrolyte ions.

4. The EDLC of claim 1, wherein at least one of said graphene electrodes is disposed on a current collector.

5. The EDLC of claim 4, wherein said current collector comprises a metal substrate.

6. The EDLC of claim 4, wherein said current collector comprises a metallic foam.

7. The EDLC of claim 1, wherein at least one of said graphene electrodes further comprises a material selected from the group consisting of:
   a transitional metal oxide; and
   a conductive polymer.

8. The EDLC of claim 1, wherein said pair of graphene electrodes are configured asymmetrically, in a manner selected from the group consisting of:
   said graphene electrodes being composed of different materials;
   said graphene electrodes having different weights; and
   said graphene electrodes having different thicknesses.

9. A method for manufacturing an electric double layer capacitor (EDLC) comprising at least one capacitor cell, the method comprising the procedures of:
   arranging a pair of graphene electrodes of opposite polarity along a first axis, said graphene electrodes aligned with their surfaces in parallel;
   coating at least one of said graphene electrodes with a peptide coating acting as an inert, electrically-insulating and ion-permeable separator, wherein said capacitor cell does not comprise an additional separator beyond said peptide coating, and wherein said peptide coating comprises at least one peptide selected from a list consisting of: Neuropeptide FF, LL-37, and Sp1; and impregnating an electrolyte within said graphene electrodes.

10. The method of claim 9, further comprising the procedure of preparing at least one electrode-unit of at least one of said graphene electrodes by:

arranging a pair of graphene layers along a first axis aligned with their surfaces in parallel and separated from one another;

arranging a plurality of CNTs along a second axis that is orthogonal to said first axis, said CNTs disposed in between said graphene layers; and impregnating an electrolyte within the volume defined between said graphene layers and said CNTs.

* * * * *